April 8, 1969    R. J. KELLER    3,437,981
ELECTRICAL WIRE JOINER
Filed June 29, 1967
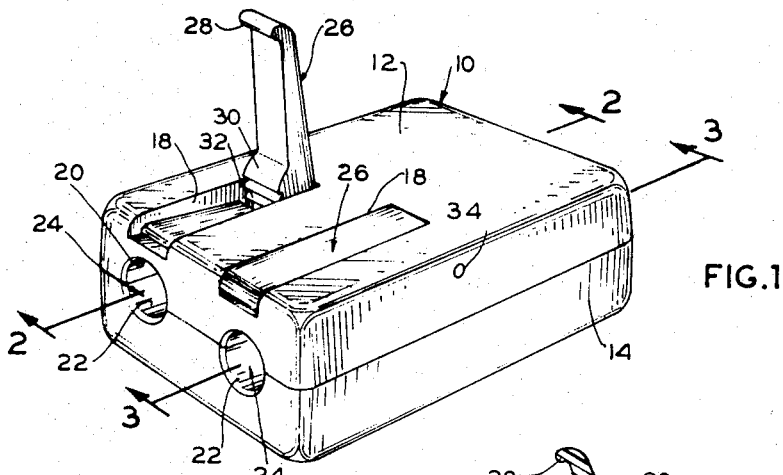
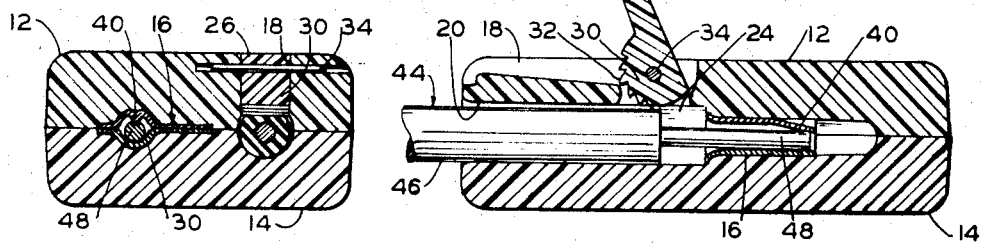
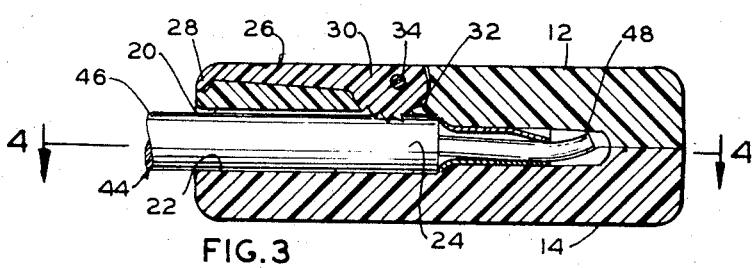
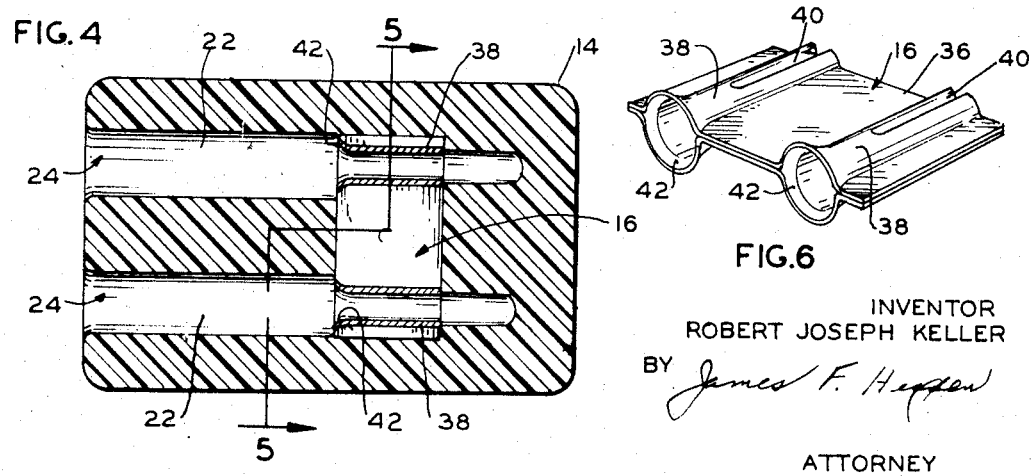
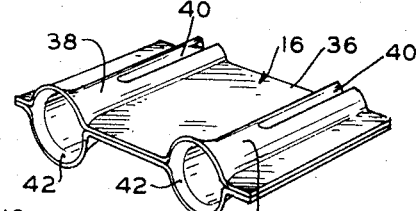
INVENTOR
ROBERT JOSEPH KELLER
BY *James F. Hepden*
ATTORNEY

United States Patent Office 3,437,981
Patented Apr. 8, 1969

3,437,981
ELECTRICAL WIRE JOINER
Robert Joseph Keller, 315 Plant Ave.,
Webster Groves, Mo. 63119
Filed June 29, 1967, Ser. No. 649,995
Int. Cl. H01r 13/42, 7/06, 13/46
U.S. Cl. 339—103                               9 Claims

ABSTRACT OF THE DISCLOSURE

This electrical wire joiner is designed to connect two electrical wires in an electrical circuit. It consists of an outer insulated rectangular case having two apertures into which the electrical wires are inserted and secured thereto by clamps. Inside the insulated rectangular case is an electrical conductor which is in contact with each of the electrical wires, thereby forming the electrical circuit.

---

This invention relates to a new and useful improvement in electrical wire joiners wherein it is desired to provide a device which will simplify the connection of two or more wires to complete an electrical circuit.

Satisfactory electrical wire joiners have been particularly difficult to design because not only is it necessary to provide a mechanically secure connection, but it is equally important to provide an electrical connection of low resistance. The most common method of joining two or more electrical wires is by the use of a screw-on type solderless connector. However this method is unsatisfactory since it is both time consuming and not entirely safe.

It is the main object of this invention to provide a device which will enable two or more electrical wires to be connected to complete an electrical circuit which will provide maximum safety.

Another object of this invention is to provide a device which will enable secure mechanical connections to be made of the joined wires.

Still another object of this invention is to provide a device which will enable connections of low electrical resistance to be made.

A further object of the present invention is to provide a device for joining electrical wires simply, quickly and with minimum effort.

Some of the advantages of the invention lie in its simplicity of construction, its convenient and expeditious operation and in its adaptability to economical manufacture.

With the above more important objects and advantages in view, and other objects and advantages as may become apparent as this specification proceeds, the invention consists essentially in the arrangement and construction of parts as illustrated in the accompanying drawings in which:

FIGURE 1 is a perspective view of the invention.
FIGURE 2 is a cross-sectional view taken at lines 2—2 of FIGURE 1.
FIGURE 3 is a cross-sectional view of the invention taken at lines 3—3 of FIGURE 1.
FIGURE 4 is a cross-sectional view of the invention taken at lines 4—4 of FIGURE 3.
FIGURE 5 is a cross-sectional view of the invention taken at lines 5—5 of FIGURE 3.
FIGURE 6 is a perspective view of an electrical conductor portion of the invention.

Like characters of reference are employed to designate like parts in the specification and throughout the several views.

Referring now to the drawings, an electrical wire joiner 10 made in accordance with the present invention is shown to include an upper rectangular portion 12, a lower rectangular member 14 and an electrical conductor portion 16 which is sandwiched between the upper rectangular member 12 and the lower rectangular member 14.

The upper rectangular member 12 is provided on its upper surface with two rectangular slots 18 and, on its lower surface, with two semi-circular grooves 20 that are in juxta-position with and parallel to the rectangular slots 18. The lower rectangular member 14 is provided with two semi-circular grooves 22 of the same diameter as the semi-circular grooves 20 which are adapted to form circular apertures 24 when the upper rectangular member 12 is secured to the lower rectangular member 14. Pivotally inserted in the rectangular slots 18 are cam locks 26 which terminate at one end in snap detents 28 and at the other end in cams 30, having knurled surfaces 32 that pivot about pivot points 34. As can be clearly seen in FIGURE 3, the cam locks 26, when in the closed position, lie flush with the upper surface of the rectangular member 12 and the knurled surfaces 32 partially protrude into one end of the circular apertures 24.

The electrical conductor portion 16 includes a flat plate section 36 and terminates at either end in tubular receptors 38. The tubular receptors 38 are provided with expansion slots 40 at one end which taper inwardly and beveled edges 42 at the other end as can be more clearly seen in FIGURE 6.

Thus, it can be seen that when an electrical wire 44 is partially stripped of its insulation 46 so as to provide a bare wire portion 48 and is inserted into an aperture 24 and pushed forward through the beveled edge 42 into the tubular receptor 38, positive pressure contact with the expansion slot 40 is achieved, thereby providing a low resistance electrical connection with the electrical conductor portion 16. The cam lock 26 is then rotated so it lies flush with the face of the upper rectangular member 12 so that the knurled surface 32 is in contact with the insulation 44, thus securing the bare wire portion 46 in contact with the expansion slot 40. The snap detent 28 then maintains the cam lock 26 in its flush position with the rectangular member 12 until it is externally released. This process is then repeated with another electrical wire 44, thereby completing an electrical circuit.

It should be noted that the width of the beveled edges 42 will be such as to provide easy movement of the bare wire portions 48 into the tubular receptors 38. In addition, the expansion slots 40 taper inwardly to provide the necessary pressure on the bare wire portion 48 the further they are pushed into the tubular receptors 38. By tapering inwardly, it can be seen that the expansion slots 40 can accommodate wires of different diameters while still maintaining sufficient pressure against them. With this arrangement, it is also possible to join two wires of different diameters in an electrical circuit.

It is to be understood that the upper rectangular member 12 and the lower rectangular member 14 can be made of any material which is an electrical nonconductor and they can be secured together by means such as cement or rivets. The electrical conductor portion 16 can be made of any electrical conductor which will give the expansion slots 40 sufficient stiffness to maintain sufficient pressure on a bare wire portion 48 after repeated use.

It is thus seen that I have provided a small light weight, quick-disconnect type of electrical wire joiner which grips electrical wires tightly so as to provide low electrical resistance and maximum safety.

While there has been described and illustrated a preferred embodiment of the present invention, it is apparent numerous alternatives, deletions and additions may be made without departing from the spirit thereof.

I claim:
1. An electrical wire joiner for connecting electrical wires comprising an upper member with a plurality of grooves, a lower member secured to the upper member with a plurality of grooves and an electrical conductor portion having a plurality of receptors which are electrically connected and, secured between the upper member and the lower member so that said receptors lie partially within the plurality of grooves of the upper member and partially within the plurality of grooves of the lower member and means for securing electrical wires within the plurality of grooves.

2. An electrical wire joiner in accordance with claim 1 wherein the plurality of grooves on both the upper and lower members are semicircular in shape and of the same diameter and form a plurality of circular apertures when the upper member is secured to the lower member, said plurality of circular apertures being adapted to accommodate electrical wires.

3. An electrical wire joiner in accordance with claim 2 wherein the plurality of circular apertures are comprised of a front chamber of a diameter sufficient to accommodate electrical wires with insulation and a rear chamber of a diameter sufficient to accommodate the receptors into which the uninsulated portion of the electrical wire is inserted.

4. An electrical wire joiner in accordance with claim 3 wherein the means for securing the electrical wires are cam locks.

5. An electrical wire joiner in accordance with claim 4 wherein the upper member is provided with a plurality of slots and where the cam locks have snap detents at one end and cams with knurled surfaces at the other end and are pivotally mounted to the upper member within the plurality of slots so that the knurled surfaces engage the insulation of the electrical wires when they are closed and when the insulated wires are positioned in the front chamber.

6. An electrical wire joiner in accordance with claim 1 wherein the electrical conductor portion consists of a central flat plate portion with receptors located at either end.

7. An electrical wire joiner in accordance with claim 6 wherein the receptors have beveled leading edges for ease of insertion of the electrical wires.

8. An electrical wire joiner in accordance with claim 7 wherein the receptors have expansion slots which are adapted to exert positive pressure on the electrical wires inserted into the receptors.

9. An electrical wire joiner in accordance with claim 8 wherein the receptors taper inwardly from the beveled leading edges to the expansion slots.

References Cited

UNITED STATES PATENTS

| 206,169 | 7/1878 | Fayman | 24—134 |
| 1,331,203 | 2/1920 | Knapp | 24—134 |
| 1,526,265 | 2/1925 | Bergman | 339—274 |
| 1,960,191 | 5/1934 | Staub et al. | 339—274 |
| 2,076,072 | 4/1937 | Douglas | 339—103 |
| 2,590,886 | 4/1952 | Pedersen | 339—274 |
| 3,319,215 | 5/1967 | Moore | 339—150 |

FOREIGN PATENTS 95,231   7/1923   Austria.

RICHARD E. MOORE, *Primary Examiner.*

JOSEPH H. McGLYNN, *Assistant Examiner.*

U.S. Cl. X.R.

339—274, 258; 24—134; 174—87